(12) United States Patent
Cheng et al.

(10) Patent No.: US 8,638,405 B2
(45) Date of Patent: Jan. 28, 2014

(54) BACKLIGHT MODULE WITH BREAKABLE SECTION FOR REPLACEMENT

(75) Inventors: Ching-Hung Cheng, Hsin-Chu (TW); Ta-Jen Huang, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 0 days.

(21) Appl. No.: 13/206,222

(22) Filed: Aug. 9, 2011

(65) Prior Publication Data

US 2012/0113351 A1    May 10, 2012

(30) Foreign Application Priority Data

Nov. 8, 2010 (TW) ................................ 99138375 A

(51) Int. Cl.
*G02F 1/1333* (2006.01)
(52) U.S. Cl.
USPC .............................................. 349/58; 349/60
(58) Field of Classification Search
USPC .............................. 349/58–60; 362/97.1–97.4
See application file for complete search history.

(56) References Cited

U.S. PATENT DOCUMENTS

| | | | |
|---|---|---|---|
| 5,516,581 A | 5/1996 | Kreckel et al. | |
| 8,388,211 B2 | 3/2013 | Chen et al. | |

FOREIGN PATENT DOCUMENTS

| | | |
|---|---|---|
| CN | 101221309 | 7/2008 |
| JP | 10232625 | 9/1998 |
| JP | 2005084510 | 3/2005 |
| JP | 2007286156 | 11/2007 |
| TW | 200926470 A | 6/2009 |
| TW | 201035630 A1 | 10/2010 |

OTHER PUBLICATIONS

Machine translation of JP2007286156.*
*Machine translation of JP2007286156 published Nov. 1, 2007.*

* cited by examiner

*Primary Examiner* — Michael Caley
*Assistant Examiner* — Kendrick Hsu
(74) *Attorney, Agent, or Firm* — WPAT, PC; Justin King

(57) ABSTRACT

A backlight module is disclosed, which includes an outer frame having a sidewall and a hole formed on the sidewall, an inner frame disposed inside of the outer frame, and an adhesive device. The inner frame includes a block wall and a support. The block wall has an inner surface, an outer surface, and a breakable section. The outer surface is in contact with the sidewall, and the breakable section is disposed corresponding to the hole. The adhesive device is disposed on the support.

7 Claims, 5 Drawing Sheets

BACKLIGHT MODULE WITH BREAKABLE SECTION FOR REPLACEMENT

RELATED APPLICATIONS

This application claims priority to Taiwan Application Serial Number 099138375, filed Nov. 8, 2010, which is herein incorporated by reference.

BACKGROUND

1. Field of Invention

The present invention relates to a liquid crystal display. More particularly, the present invention relates to a backlight module.

2. Description of Related Art

Recently, liquid crystal displays (LCD) have been widely applied in electrical products, due to the rapid progress of optical technology and semiconductor technology. Moreover, with the advantages of high image quality, compact size, light weight, low driving voltage, and low power consumption, LCDs have been introduced into portable computers, personal digital assistants, color televisions, and are gradually replacing the cathode ray tubes (CRT) used in conventional displays. LCDs have become the mainstream display apparatus.

The LCD mainly includes a liquid crystal display panel, a backlight module, and a bracket. The backlight module provides the light source, which includes a light bar, a light guide plate, and a frame. The liquid crystal display panel is stuck on the frame of the backlight module with a double side adhesive tape, and then the liquid crystal display panel and the backlight module are assembled in the bracket.

FIG. 1 is a sectional diagram of a conventional backlight module. The backlight module 100 includes an outer frame 110, and inner frame 120, and a light guide plate 130. The inner frame 120 is disposed inside of the outer frame 110. The inner frame 120 has a block wall 122 and a support 124 connected to the block wall 122. The support 124 is disposed on the inner surface of the block wall 122. The outer surface of the block wall 122 is in contact with the outer frame 110. The light guide 130 is placed on the outer frame 110. A liquid crystal display panel 190 is placed on the support 124 of the inner frame 120. The backlight module 100 further includes an adhesive device 140 for fastening the liquid crystal display panel 190 on the support 124.

The adhesive device 140 can be a double adhesive tape. The liquid crystal display panel 190 is fastened on the support 124 tightly with the adhesive device 140, so that it is difficult to separate the liquid crystal display panel 190 from the backlight module 100 directly, and that may cause unwanted damages.

The double adhesive tape would tightly fasten the liquid crystal display panel on the frame, thus it is difficult to separate the liquid crystal display panel from the backlight module directly but not raise to damages of the liquid crystal display panel and the backlight module, and the rework process becomes difficult when there is a need to repair or change the liquid crystal display panel.

SUMMARY

An object of the invention is to provide a backlight module to prevent the liquid crystal display panel or the backlight module from being damaged during the rework process.

An aspect of one embodiment of the invention provides a backlight module, which includes an outer frame having a sidewall and a hole formed on the sidewall, an inner frame disposed inside of the outer frame, and an adhesive device. The inner frame includes a block wall and a support. The block wall has an inner surface, an outer surface, and a breakable section. The outer surface is in contact with the sidewall, and the breakable section is disposed corresponding to the hole. The adhesive device is disposed on the support.

The breakable section can include an opening communicated with the hole, and the adhesive device has an extending portion extending from a side of the adhesive device and inserting into the opening. An edge of the extending portion aligns an outer surface of the outer frame. The extending portion is extended through the hole and is stuck on an outer surface of the outer frame. The backlight module further includes a liquid crystal display panel positioned on the support with the adhesive device, wherein the extending portion is exposed to the liquid crystal display panel. The outer frame includes a bottom plate connected to the sidewall vertically, and the inner frame includes a bottom portion disposed above the bottom plate, and the hole further penetrates to the bottom plate. The breakable section is broken from the hole to destroy a part of the adhesive device, which is disposed at the breakable section. The backlight module further includes a notch disposed on an end of the breakable section, wherein the notch is disposed on the bottom portion and does not cut through the inner frame. An end of the breakable section can be separated from the inner frame. The backlight module can further include a connecting neck disposed at an end of the breakable section for connecting the breakable section and the inner frame. The breakable section includes a pulling structure, and the pulling structure is exposed from the hole. The pulling structure can be a slot or a protrusion.

The breakable section is formed on the inner frame of the backlight module of the invention, and the adhesive device disposed above the breakable section can be easily destroyed during the rework process. Therefore the liquid crystal display panel can be separated from the backlight module easily, and the damages of the liquid crystal display panel or the backlight module during the rework process can be reduced.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE EMBODIMENTS

Figure 1:
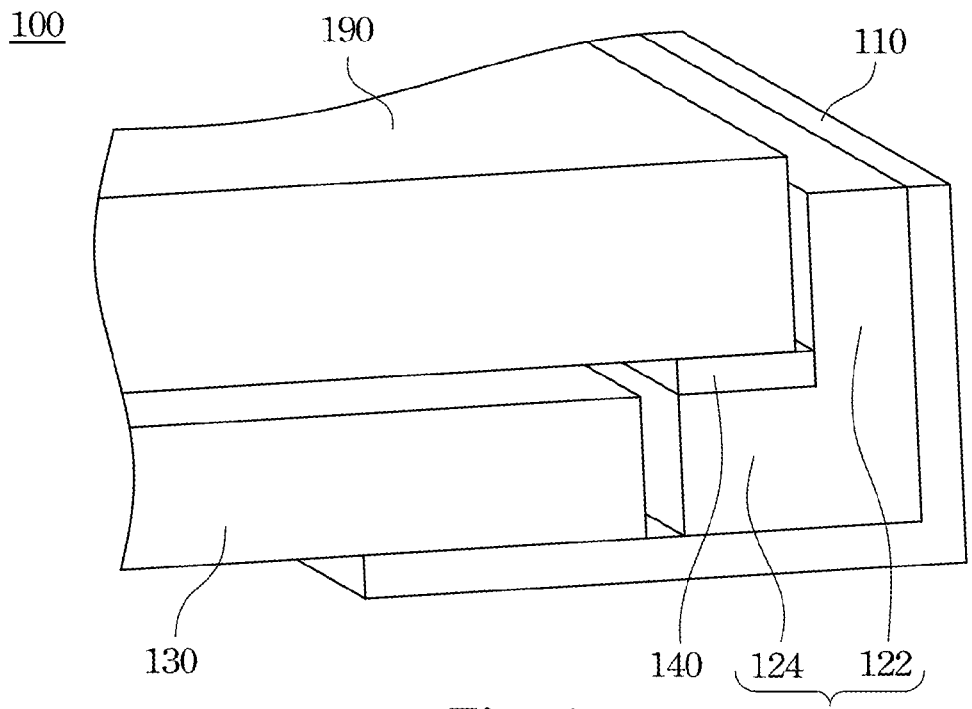
FIG. 1 is a sectional diagram of a conventional backlight module.

Reference will now be made in detail to the present embodiments of the invention, examples of which are illustrated in the accompanying drawings. Wherever possible, the same reference numbers are used in the drawings and the description to refer to the same or like parts.

Figure 2:
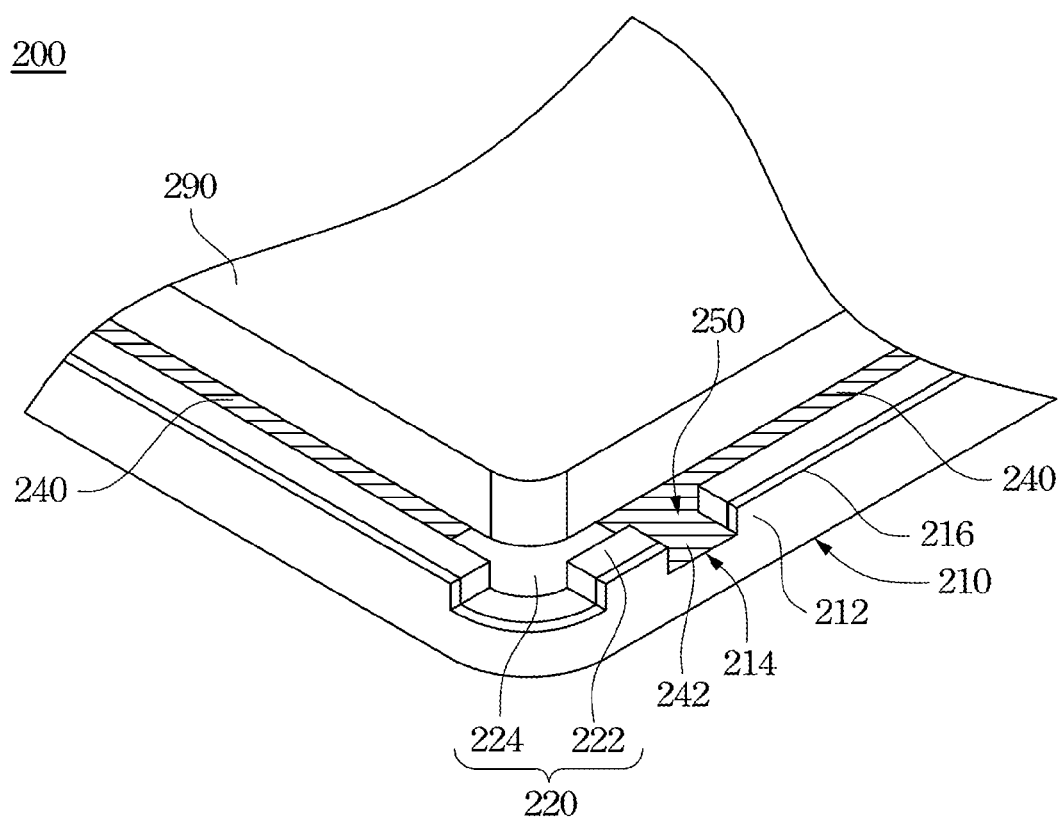
FIG. 2 is an oblique diagram of a first embodiment of the backlight module of the invention.

FIG. 2 is an oblique diagram of a first embodiment of the backlight module of the invention. The backlight module 200 includes an outer frame 210, and inner frame 220 and an adhesive device 240. The outer frame 210 has a sidewall 212, and a hole 214 formed on the sidewall 212. The inner frame 220 is disposed inside of the outer frame 210. The inner frame 220 includes a block wall 222 and a support 224. The block wall 222 has an inner surface, an outer surface. The support 224 is disposed on the inner surface of the block wall 222, and the outer surface of the block wall 222 is in contact with the outer frame 210. A liquid crystal display panel 290 is disposed on the support 224 and is positioned by the block wall 222. The adhesive device 240 is disposed between the support 224 and the liquid crystal display panel 290. The adhesive device 240 adheres to the support 224 and the liquid crystal display panel 290 respectively, so that the liquid crystal display panel 290 is positioned on the support 224 with the adhesive device 240.

The block wall 222 of the inner frame 220 has a breakable section 250. The breakable section 250 is disposed corresponding to the hole 214. The breakable section 250 can be an opening. The breakable section 250 is communicated with the hole 214. That is, the opening of the breakable section 250 is disposed corresponding to the hole 214 and it results to form a through hole in outer frame 210 and inner frame 220 via the hole 214 aligning to opening of the breakable section 250. The adhesive device 240 can be a twin adhesive tape. The adhesive device 240 further includes an extending portion 242. The adhesive device 240 and the extending portion 242 are configured as a T-shaped structure or an L-shaped structure. The adhesive device 240 and the extending portion 242 are configured as an L-shaped structure in this embodiment. The extending portion 242 is extended from a side of the adhesive device 240 and inserts into the opening of the breakable section 250. The breakable section 250 and the extending portion 242 thereon are exposed to the liquid crystal display panel 290. That is, the liquid crystal display panel 290 thereon does not cover the breakable section 250 and the extending portion 242. The length of the extending portion 242 is at least for inserting to the opening of the breakable section 250. In one or some embodiments, the edge of the extending portion 242 aligns an outer surface 216 of the outer frame 210, referred to FIG. 2.

The rework process of separating the liquid crystal display panel 290 with the backlight module 200 can start at the opening of the breakable section 250. The extending portion 242 on the opening of the breakable section 250 is not covered by the liquid crystal display panel 290, and the extending portion 242 can be easily peeled from the inner frame 220 to break the adhesive state between the adhesive device 240 and the inner frame 220. Therefore the liquid crystal display panel 290 can be easily peeled from the backlight module 200.

Figure 3:
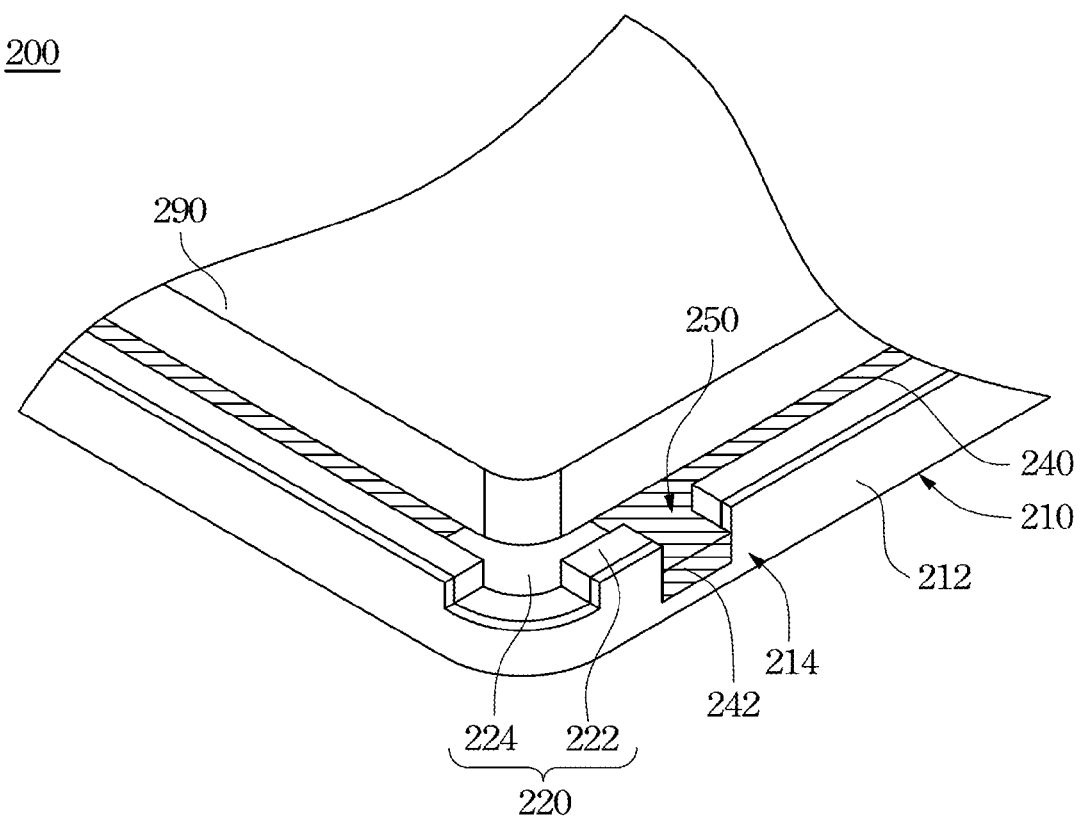
FIG. 3 is a schematic diagram of a second embodiment of the backlight module of the invention.

FIG. 3 is a schematic diagram of a second embodiment of the backlight module of the invention. The backlight module 200 includes the outer frame 210, the inner frame 220, and the adhesive device 240. The hole 214 is formed on the sidewall 212 of the outer frame 210. The breakable section 250 formed on the inner frame 220 is the opening. The liquid crystal display panel 290 is disposed on the support 224 and is positioned by the block wall 222. The adhesive device 240 is disposed on the support 224 to fasten the liquid crystal display panel 290 on the support 224. The extending portion 242 of the adhesive device 242 inserts to the opening of the breakable section 250. In one or some embodiments, the extending portion 242 is extended over the hole 214 and is stuck on the outer surface of the sidewall 212. In other words, the extending portion 242 is extended through the hole 214 to exceed the outer surface of the sidewall 212, referred to FIG. 3. The extending portion 242 exposed to the outer surface of the sidewall 212 results to provide an easy way to peel of the adhesive device 240.

There is a particular ratio between the adhesive device 240 and the extending portion 242 thereof, so that the rework function can be provided after peeling the extending portion 242 to break the adhesive state of the adhesive device 240. For example, the length ratio of the extending portion 242 to the adhesive device 240 can be 1 to 10 in the same width. The length of the adhesive device 240 is closer to or smaller than the extending portion 242 to be easier to peel the adhesive device 240 by tearing the extending portion 242 off. However the ratio of the extending portion 242 to the adhesive device 240 is related to the weight and the size of the liquid crystal display panel 290. Users can design the ratio thereof according to the requirement.

Figure 4:
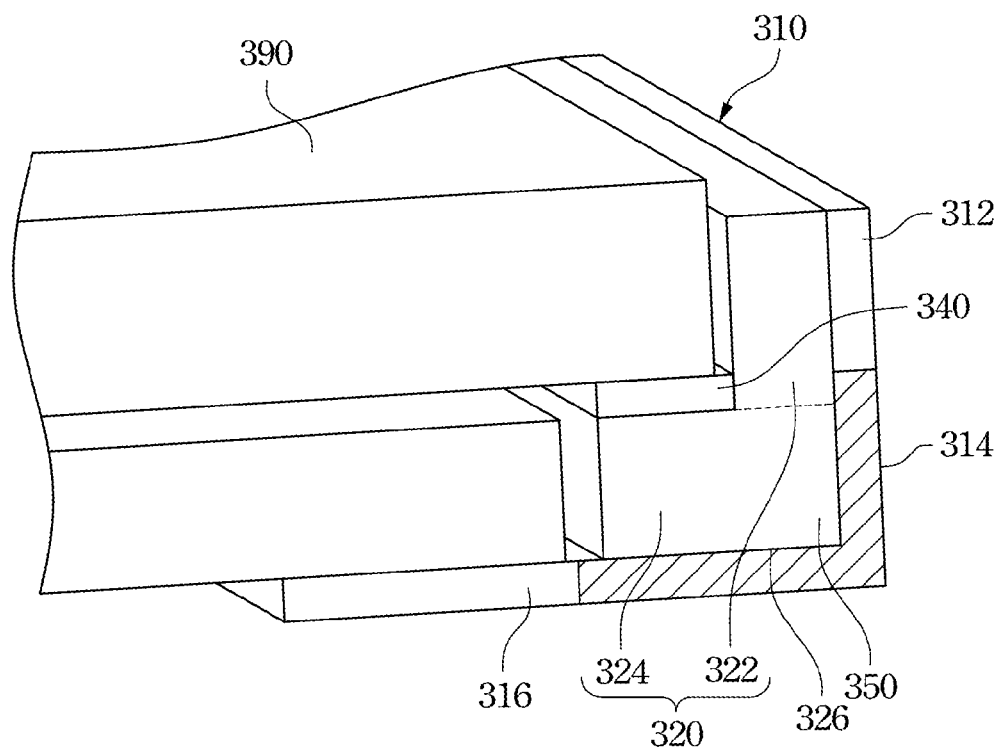
FIG. 4 is a sectional diagram of a third embodiment of the backlight module of the invention.

FIG. 4 is a sectional diagram of a third embodiment of the backlight to module of the invention. The backlight module 300 includes the outer frame 310, the inner frame 320, and the adhesive device 340. The outer frame 310 has the sidewall 312 and a bottom plate 316, wherein the bottom plate 316 is connected to the sidewall 312 vertically. The outer frame 310 has the hole 314, and the hole 314 is formed on the sidewall 312 and the bottom plate 316. The hole 314 formed on the sidewall 314 further penetrates the bottom plate 316. The inner frame 320 has the block wall 322 and the support 324. The liquid crystal display panel 390 is disposed on the support 324 and is positioned by the block wall 322. The adhesive device 340 is disposed on the support 324 to fasten the liquid crystal display panel 390 on the support 324. The inner frame 320 has the breakable section 350. The inner frame 320 has a bottom portion 326 disposed above the bottom plate 316. The breakable section 350 is disposed corresponding to the hole 314, and a part of the adhesive device 340 is disposed on the breakable section 350.

Figure 5A:
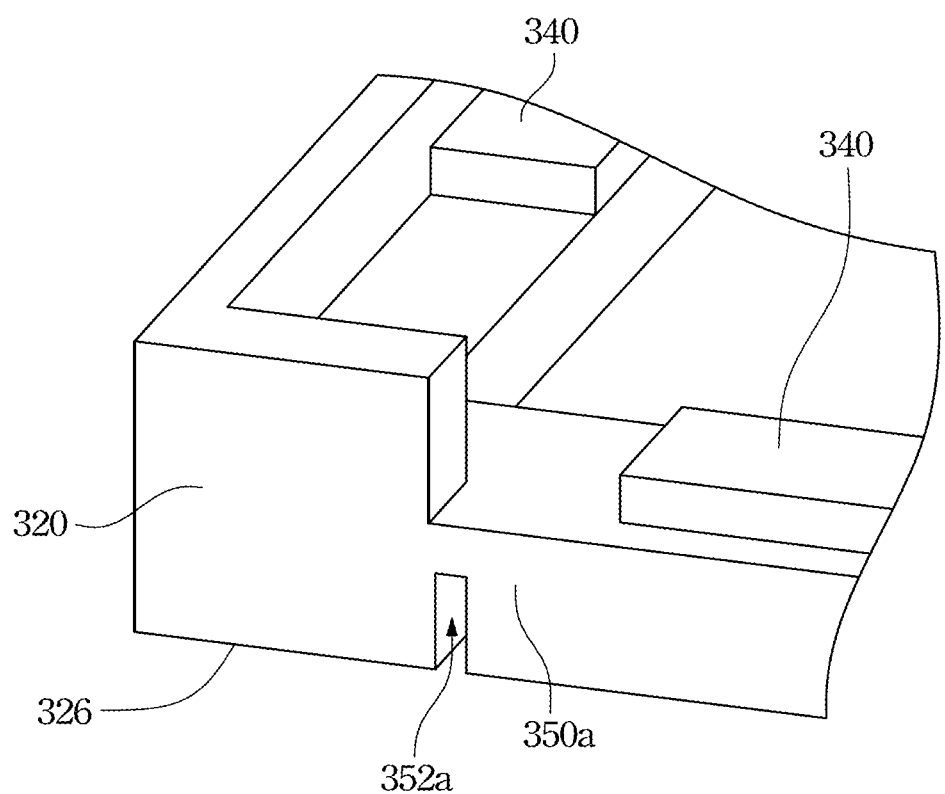
FIG. 5A to FIG. 5C are schematic diagrams of different embodiments of the breakable section in FIG. 4.
Figure 5B:
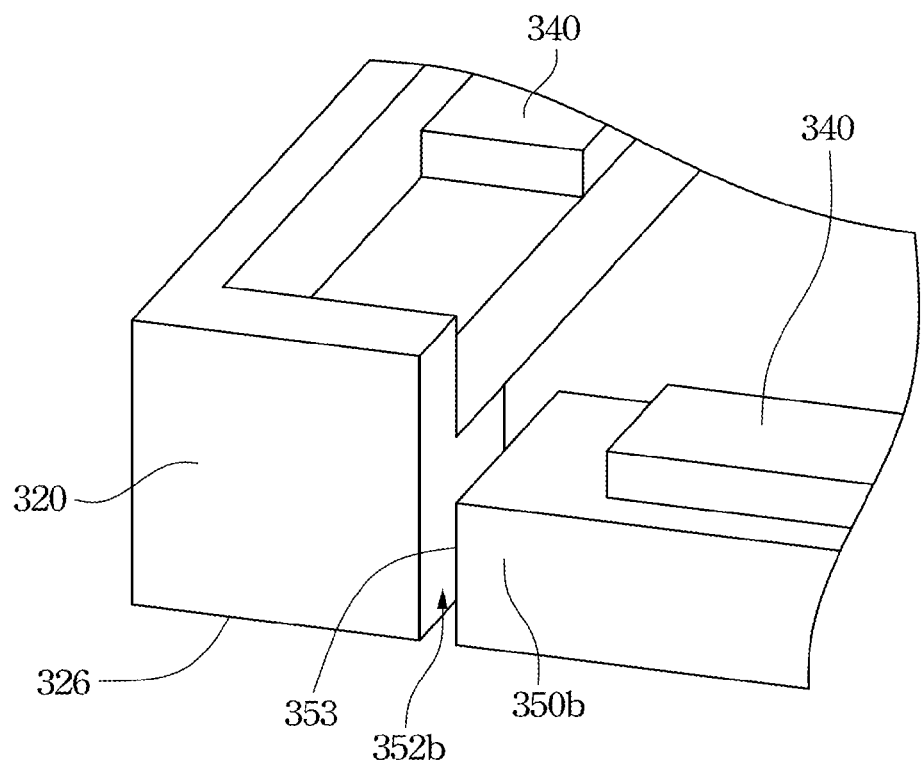
Figure 5C:
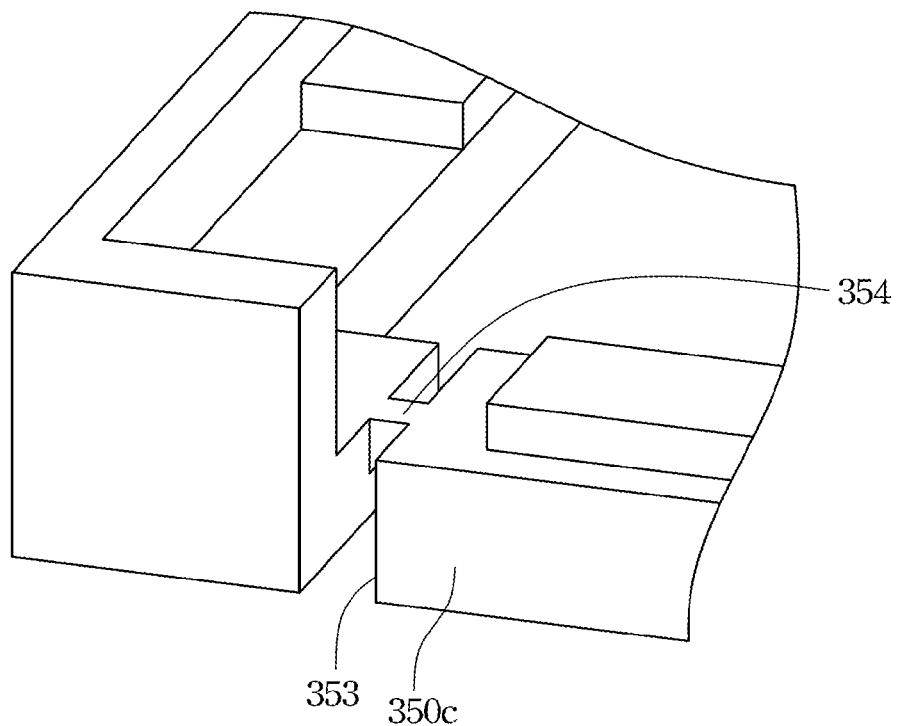

FIG. 5A to FIG. 5C are schematic diagrams of different embodiments of the breakable section in FIG. 4. The outer frame 310 has been omitted for better description in FIG. 5A to FIG. 5C. The breakable section 350a has been cut partially but has not been cut through. The breakable section 350a is formed within the hole 314 (see FIG. 4). A first notch 352a is formed on an end of the breakable section 350a, or two first notches 352a are formed on opposite ends of the breakable section 350a to define the breakable section 350a. The first notch 352a is cut from the bottom portion 326 of the inner frame 320. The first notch 352a disposed on the bottom portion 326 does not cut through the inner frame 320. The first notch 352a would be enlarged to break the inner frame 320 when an external force is applied on the breakable section 350a, thus the end of the breakable section 350a would be separated from and does not connect to the inner frame 320.

In one or some embodiments, referred to FIG. 5B, a part of the adhesive device 340 is disposed above the breakable section 350b. The breakable section 350b is disposed within the hole 314 (see FIG. 4). A second notch 352b is formed on an end 353 of the breakable section 350b. The second notch 352b cuts through the inner frame 320 completely, and the end 353 of the breakable section 350b would be separated from and does not connect the inner frame 320. The second notch 352b can be a break point when there is an external force applied on the breakable section 350b. Another end of the breakable section 350b can connect with the inner frame 320 in whole. But it is not limited to. In one or some embodiments, another end of the breakable section 350b can optionally have the first notch 352a (see FIG. 5A). The breakable section 350b can be defined by the first notch 352a and the second notch 352b.

In FIG. 5C, a part of the adhesive device 340 is disposed above the breakable section 350c. The breakable section 350c is disposed within the hole 314 (see FIG. 4). A connecting neck 354 is disposed on an end 353 of the breakable section 350c. The connecting neck 354 can reduce the sectional area of the breakable section 350c connected to the inner frame 320. The end 353 of the breakable section 350 is connected with the inner frame 320 by the connecting neck 354. The connecting neck 354 would be broken and the connecting between the breakable section 350c and the inner frame 320 would be destroyed when there is an external force applied on the breakable section 350c. Another end of the breakable section 350b can connect with the inner frame 320 in whole. But it is not limited to. In one or some embodiments, another end of the breakable section 350c can optionally have the first notch 352a (see FIG. 5A) or another connecting neck 354. The breakable section 350c can be defined by the connecting neck 354 and the first notch 352a or the connecting neck 354.

As disclosed above, the first notch 352a, the second notch 352b, and the connecting neck 354 can be selected and arranged according to actual requirement. The arrangement and the combination are not limited by the disclosed embodiments.

Figure 6A:
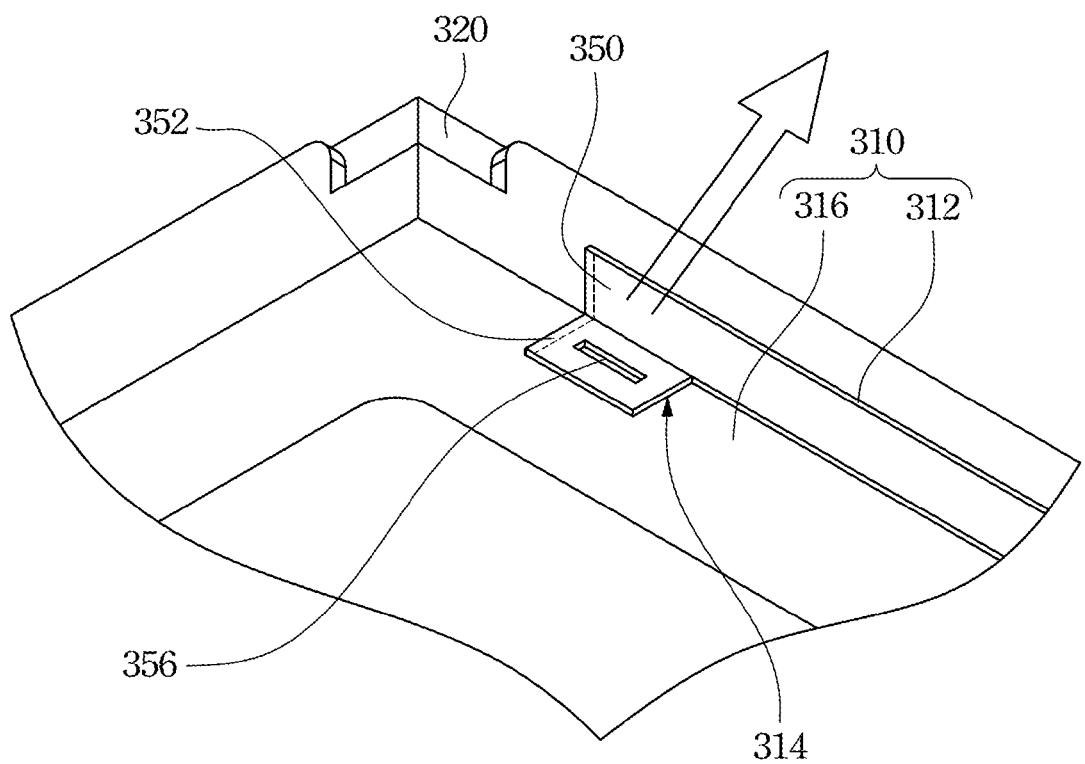
FIG. 6A and FIG. 6B are operating schematic diagrams of different states of the third embodiment of the backlight module in FIG. 4.
Figure 6B:
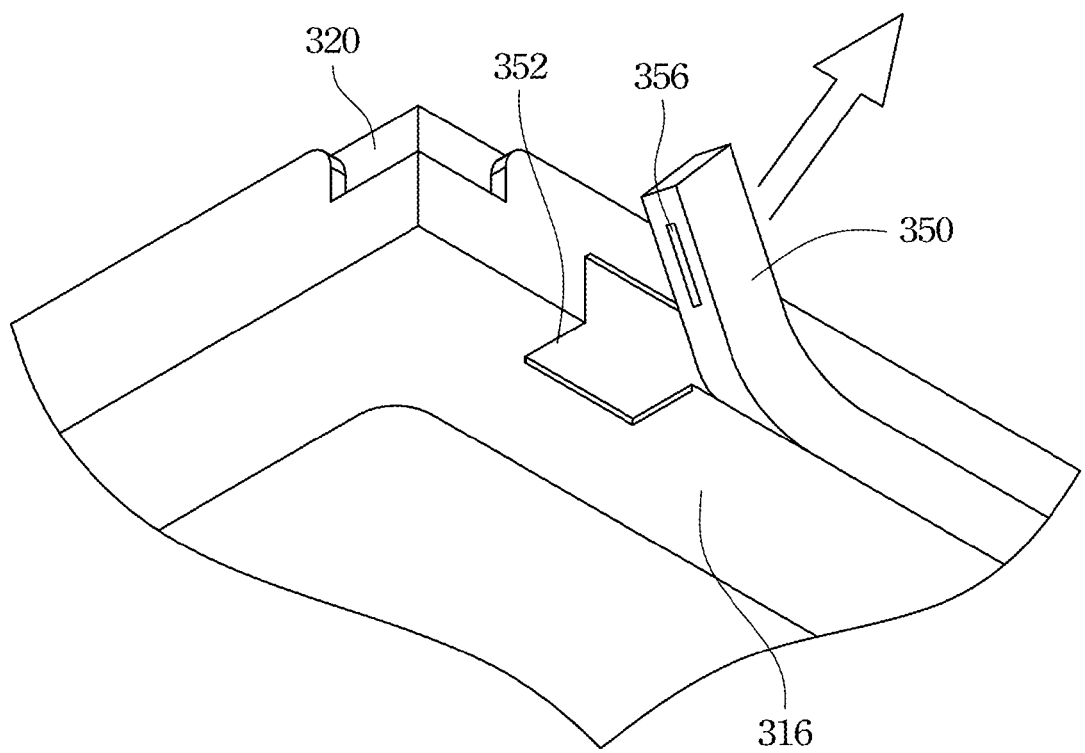

FIG. 6A and FIG. 6B are operating schematic diagrams of different states of the third embodiment of the backlight module in FIG. 4. The breakable section 350 is disposed in the hole 314 and exposed to the hole 314. The breakable section 350 includes a pulling structure 356, and the pulling structure 356 is exposed to the hole 314. The pulling structure 356 is disposed on the bottom or the side of the breakable section 350. The pulling structure 356 can be a slot or a protrusion. In one or some embodiments, the hole 314 is only formed on the sidewall 312, not extended to the bottom plate 315 (not shown). The pulling structure 356 is disposed on the side of the breakable section 350 to expose to the hole 314.

As shown in FIG. 6A, users can use finger or tool to apply an external force on the pulling structure 356 for pulling the pulling structure 356 and bending the breakable section 350 from the hole 314. The breakable section 350 can be bent as shown in FIG. 6B, and the part of the adhesive device 340 (see FIG. 4) is destroyed. The adhesive state between the breakable section 350 and the part of the adhesive device 340 is broken, thus the adhesive device 340 can be further peeled from the part disposed above the breakable section 350. Other adhesive devices 340 placed at different sides can also be peeled easily due to the destroyed part of the adhesive device 340. Therefore, the liquid crystal display panel 390 (see FIG. 4) can be easily separated from the inner frame 320 during the rework process and would not be damaged during rework process.

In this embodiment, only one end of the breakable section 350 would be broken and bent from the hole 314, and another end of the breakable section 350 is still connected to the inner frame 320. The part of the adhesive device 340 (see FIG. 4) would be destroyed and becomes being removed easily during the liquid crystal display panel rework process. The breakable section 350 can be inserted into the hole 314 after the liquid crystal display panel is reworked, and another new adhesive device can stick on the breakable section 350 and the inner frame 320 to fasten the breakable section 350, and the liquid crystal display panel 390. is further disposed on the adhesive device.

FIG. 6A and FIG. 6B show that only one end of the breakable section 350 is departed from the inner frame 320, and the breakable section 350 is bent from the hole 314. But it is not limited to, the breakable section 350 may have more than one notch. In one or some embodiments, the breakable section 350 may also be completely separated from the inner frame 320 when there are notches disposed on opposite ends of the breakable section 350 or due to over bending the breakable section 350. However, the ratio of the breakable section 350 to the inner frame 320 is small that support function of the inner frame 230 for supporting the liquid crystal display panel would not be reduced due to lacking the part of the inner frame 320 (the breakable section 350). The adhesive device on the inner frame 320 (without breakable section 350) can still adhere the liquid crystal display panel on the inner frame 320 and maintain liquid crystal display panel fix on the inner frame 320.

According to above embodiments, the present invention has the following advantages. The breakable section is formed on the inner frame of the backlight module of the invention, and the adhesive device disposed above the breakable section can be easily destroyed during the rework process. Therefore the liquid crystal display panel can be separated from the backlight module easily, and the damages of the liquid crystal display panel or the backlight module during the rework process can be reduced.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A backlight module comprising:
   an outer frame having a sidewall and a hole formed on the sidewall;
   an inner frame disposed inside of the outer frame, the inner frame comprising:
      a block wall having an inner surface and an outer surface, wherein the outer surface is in contact with the sidewall; and
      a support disposed on the inner surface of the block wall;
   a breakable section disposed corresponding to the hole,
   a connecting neck for physically connecting an end of the breakable section to the inner frame, wherein a cross-sectional area of the connecting neck connected to the inner frame is smaller than a cross-sectional area of the inner frame; the inner frame, the breakable section, and the connecting neck are one-piece formed and are made of the same material; and
   an adhesive device disposed on the support.

2. The backlight module of claim 1, wherein the outer frame comprises a bottom plate connected to the sidewall vertically, and the inner frame comprises a bottom portion disposed above the bottom plate, and the hole further penetrates to the bottom plate.

3. The backlight module of claim 2, wherein the breakable section is broken from the hole to destroy a part of the adhesive device which is disposed at the breakable section.

4. The backlight module of claim 3, further comprising a notch disposed on the end of the breakable section, wherein the notch is disposed on the bottom portion and does not cut through the inner frame.

5. The backlight module of claim 3, wherein the breakable section comprises a pulling structure and the pulling structure is exposed from the hole.

6. The backlight module of claim 5, wherein the pulling structure is a slot or a protrusion.

7. The backlight module of claim 1, wherein the cross-sectional area of the connecting neck is smaller than a cross-sectional area of the breakable section.

* * * * *